United States Patent
Leister

(10) Patent No.: US 8,355,190 B2
(45) Date of Patent: Jan. 15, 2013

(54) METHOD AND DEVICE FOR REDUCING SPECKLE

(75) Inventor: Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 447 days.

(21) Appl. No.: 12/520,156

(22) PCT Filed: Dec. 4, 2007

(86) PCT No.: PCT/EP2007/063246
§ 371 (c)(1),
(2), (4) Date: Aug. 14, 2009

(87) PCT Pub. No.: WO2008/074628
PCT Pub. Date: Jun. 26, 2008

(65) Prior Publication Data
US 2009/0296176 A1   Dec. 3, 2009

(30) Foreign Application Priority Data
Dec. 19, 2006  (DE) .......................... 10 2006 062 376

(51) Int. Cl.
*G03H 1/00* (2006.01)
(52) U.S. Cl. .......................................... 359/32; 359/34
(58) Field of Classification Search .................... 359/10, 359/11, 32, 34, 35
See application file for complete search history.

(56) References Cited

U.S. PATENT DOCUMENTS 5,644,414 A * 7/1997 Kato et al. ...................... 359/22
2007/0081207 A1 * 4/2007 Bimber ............................ 359/9

FOREIGN PATENT DOCUMENTS

| DE | 195 41 071 | 5/1997 |
| DE | 197 04 741 | 8/1998 |
| DE | 101 37 832 | 12/2002 |
| DE | 103 53 439 | 6/2004 |
| WO | WO 95/20811 | 8/1995 |
| WO | WO 2006/119920 | 11/2006 |

OTHER PUBLICATIONS

International Search Report, dated Feb. 29, 2008, issued in priority International Application No. PCT/EP2007/063246.

* cited by examiner

Primary Examiner — Jennifer L. Doak
(74) Attorney, Agent, or Firm — Saul Ewing LLP

(57) ABSTRACT

A method for reducing speckle patterns of a three-dimensional holographic reconstruction is disclosed. A controllable light modulator into which a hologram of a three-dimensional scene is coded is illuminated by coherent light, a reconstruction lens transforms the modulated light into an eye position and reconstructs the three-dimensional scene in a reconstruction space and a control means controls the illumination. This provides a holographic reproduction device in which the speckle patterns occurring during reconstruction of a three-dimensional scene are reduced. According to one embodiment, a next-to-real time method is presented using a carrier medium of conventional image refresh rate.

20 Claims, 2 Drawing Sheets

METHOD AND DEVICE FOR REDUCING SPECKLE

CROSS REFERENCE TO RELATED APPLICATIONS

This application claims the priority of PCT/EP2007/063246, filed on Dec. 4, 2007, which claims priority to German Application No. 10 2006 062 376.2, filed Dec. 19, 2006, the entire contents of which are hereby incorporated in total by reference.

FIELD OF THE INVENTION

The present invention relates to a method for reducing speckle patterns in a three-dimensional holographic reconstruction of a three-dimensional scene, and to a holographic display device used to implement that method.

This invention can be applied in conjunction with methods which allow complex wave fronts of a three-dimensional scene (3D scene) to be recorded and reconstructed with the help of holography, preferably using laser light in real-time or in near-realtime in holographic display devices, where the reconstruction can be seen from a virtual observer window.

BACKGROUND OF THE INVENTION

Holography allows a three-dimensional object or a moving 3D scene to be recorded and optically represented using wave-optical methods. The 3D scene is encoded on a light modulator which serves as a carrier medium. Due to the illumination with light waves which are capable of generating interference, each point of the encoded 3D scene forms a point of origin of light waves which interfere with each other, and which, as a resultant light wave front, spatially reconstruct the 3D scene as if it was generated by light propagating from a real object in space. The holographic reconstruction of the object or the 3D scene is preferably realised with the help of a projection device and/or an optical reconstruction system by illuminating a carrier medium with normally sufficiently coherent light.

In this document, the 3D scene is reconstructed in a holographic display device with an observer window, which here is a visibility region in a periodicity interval of the complex-valued wave front located in the rear focal plane of a reconstruction means in a reconstruction space. The reconstruction of the 3D scene can be viewed from the observer window by a left and/or right eye of an observer. The size of the observer window in front of a display means is defined; it is typically at least as large as an eye pupil.

Seen from the wave-optical point of view, the observer window is represented by either a direct or an inverse Fourier transform or Fresnel transform of a hologram encoded on a carrier medium, or by the image of a wave front encoded on a carrier medium in a reconstruction space, where the observer window comprises only one diffraction order of a periodical reconstruction. The hologram or the wave front are computed from the 3D scene such that, within the one diffraction order which is used as the visibility region, cross-talking of other diffraction orders into the observer window is prevented, which would typically occur in reconstructions when using light modulators. In conjunction with an arrangement or a method for suppressing higher diffraction orders, 3D scenes can be consecutively presented in a multiplexed process to a left and to a right eye of an observer without any cross-talking.

Moreover, a multiplexed process with the aim to serve multiple persons only becomes possible thereby.

Carrier or recording media for holograms and complex wave fronts of a 3D scene include spatial light modulators, such as LCD, LCoS etc., which modulate the phase and/or amplitude of incident light. The refresh frequency of the carrier medium must be sufficiently high in order to be able to reconstruct moving 3D scenes.

The values which are encoded into pixels which are arranged in regular patterns on the carrier medium, can originate from a real object or be a computer-generated hologram (CGH).

The observer can view the reconstruction of the 3D scene by looking directly on to the carrier medium. In this document this arrangement is referred to as direct-view display. Alternatively, the observer can look on to a screen on to which either an image or a transform of the values encoded on the carrier medium is projected. In this document, this arrangement is referred to as a projection display.

Both the screen in the projection display and the carrier medium in the direct-view display are meant by the term 'screen' below.

Due to the discrete recording and because of the effects of deflection, the reconstruction of the hologram is only possible within one periodicity interval of the reconstruction of a wave front, said periodicity interval being defined by the resolution of the carrier medium. The reconstruction is typically repeated showing irregularities in adjacent periodicity intervals.

Disturbing patterns, which are also known as speckle patterns or granulation, occur when using coherent laser light for illuminating a light modulator. Speckle can be described as a granulation-like interference pattern which is created by interference of multiple light waves with statistically irregularly distributed phase differences.

The reconstruction of a hologram is adversely affected by the speckle patterns. The 3D scene is typically discretely scanned for hologram computation, because it can only be recorded discretely on the carrier medium. Certain encoding methods, where information of the 3D scene is recorded in a suitable manner on the carrier medium, generally make possible a reconstruction where the reconstruction is fully identical to the scanned object at the positions of the scan points. The physical reconstruction results in a continuous gradient, also between the scan points. Deviations from the light intensity gradient in the object occur between the scan points, so that the reconstruction exhibits speckle patterns, which reduce the quality of the reconstruction. This is in particular the case when computing the hologram with a random phase of the object points, which is, however, advantageous for certain other reasons.

Reducing the speckle patterns in the reconstruction of the 3D scene can be realized by temporal or/and spatial averaging, where the reconstruction is created from values of a 3D scene encoded on an external carrier medium or from hologram values which are computed in another suitable way. The eye of the observer always averages multiple reconstructions presented to him with different speckle patterns, resulting in a perceivable reduction of this disturbance.

In document DE 195 41 071 A1, a rotating rectangular glass plate is put into the optical path in order to average the granulation when checking a hologram. The speckles do not appear disturbing anymore because the glass plate rotates at a frequency which is adapted to that of a detector. However, such a method can only be applied for reducing a two-dimensional, plane speckle pattern, where the diffusing screen must be disposed in the plane of the speckle pattern.

As regards temporal averaging in order to reduce speckle patterns of a 3D scene, a known method is that the 3D scene is computed with a given number of different random phases, and the respective holograms are represented on the carrier medium one after another at a fast pace. Due to the multiple hologram computations the computational load increases considerably and the refresh frequency of the carrier medium would also have to increase significantly when representing the holograms, which is undesired.

As regards spatial averaging, it is generally known from the literature that a carrier medium is divided into multiple independent sections, where repetitions of subholograms which are computed from the same object, but with different object phases, are written next to each other and/or below each other. The eye of the 20 observer averages different speckle patterns of the individual reconstructions of the computed sub-holograms generated with a Fourier transformation or Fresnel transformation, so that the resulting speckle pattern appears weakened.

However, this method cannot be applied to a holographic display with an observer window, as described by the applicant in document DE 103 53 439 A1 and on which this invention is based. A complex-valued light distribution of the diffraction image of an object, e.g. a 3D scene, is computed in the observer window. Transformations of individual object planes, into which the 3D scene is virtually sliced, are realised and added in the observer window in order to achieve this. The transformations correspond with the optical propagation of light between the sliced object planes and the plane comprising the observer window. This method has the effect that each object point is assigned with a confined localised section on a screen, to which the information for the reconstruction of this point is written. This is necessary to allow a correct reconstruction from the observer window.

Encoding multiple sub-holograms, which are computed from the 3D scene next to each other and/or below each other on the screen, as suggested in the prior art, would have the effect that the hologram values which correspond to an object point are repeated in different sections on the screen. This is not possible though in conjunction with the principle of making visible the reconstructed 3D scene from the observer window. It is a general disadvantage of a spatial repetition of subholograms that the resolution of each individual sub-hologram is reduced in a given carrier medium.

SUMMARY OF THE INVENTION

An object of the claimed invention is to significantly reduce the speckle patterns which occur when reconstructing a 3D scene in a holographic display device with a virtual observer window, and to provide a near-real-time method where a carrier medium with a conventional refresh frequency can be used.

The claimed invention is generally based on a method where a controllable light modulator, on which a hologram of a 3D scene is encoded, is illuminated with sufficiently coherent light, where an optical reconstruction system transforms modulated light into an observer window or into an eye position in a reconstruction space and reconstructs the 3D scene in a reconstruction space, and where the illumination is controlled with the help of a control means.

An observer window in accordance with the claimed invention is based on for reconstructing the 3D scene can be considered to be identical with the eye position as the position in the reconstruction space where different light distributions of the complex-valued wave fronts of the encoded hologram are created. The eyes of the observer must be in that eye position in order to be able to see the reconstructed 3D scene.

According to the claimed invention, an object is solved by this method, where the control means affects at least one characteristic of the coherent light such that multiple complex-valued wave fronts with different wavelengths pass the light modulator, where they are modulated with the encoded hologram values and where the modulated complex-valued wave fronts are transformed into the eye position by the optical reconstruction system and create multiple reconstructions of the 3D scene at the same position in the reconstruction space with slightly different speckle patterns, said reconstructions being averaged from the eye position as a single reduced-speckle reconstruction of the 3D scene.

By affecting the wavelength of the light, multiple slightly modified reconstructions of the same 3D scene with slightly modified speckle patterns can preferably be created.

According to an embodiment of the method, the following process steps are performed:
 An illumination means generates a fast-paced sequence of light pulses, controlled by the control means, in order to illuminate the optical reconstruction system and the light modulator, where the wavelengths of the light pulses can differ slightly,
 The fast-paced sequence of light pulses passes the light modulator, where the complex-valued wave fronts of the light pulses are modulated with the encoded hologram values, and
 The fast-paced sequence of the modulated complex-valued wave fronts is transformed into the eye position of the reconstruction space and creates multiple reconstructions of the same 3D scene one after another at a fast pace at the same position in the reconstruction space.

According to a further embodiment of this invention, the method can alternatively comprise the following process steps, while the same result is obtained:
 Multiple illumination means simultaneously emit coherent light which is affected by the control means such that multiple complex-valued wave fronts with slightly different wavelengths simultaneously illuminate both the optical reconstruction system and the light modulator,
 The complex-valued wave fronts with slightly different wavelengths simultaneously pass the light modulator where they are modulated with the encoded hologram values, and
 Multiple modulated wave fronts are simultaneously transformed into the eye position of the reconstruction space and simultaneously create and overlap the different reconstructions of the same 3D scene at the same position in the reconstruction space.

Lasers are preferably used as illumination means, said lasers being disposed in a spatially interleaved manner, such that the coherent light of an individual illumination means is imaged with the help of separate optical imaging systems into separate optical fibres, and which is subsequently united in a single optical fibre in order to simultaneously illuminate the optical reconstruction system and the light modulator.

This provides in a simple manner an illumination means which provides coherent light with slightly different wavelengths for simultaneously illuminating the light modulator.

A method according to the claimed invention can be applied separately for a right eye and a left eye of an observer, e.g. one after another.

The different wavelengths in the described methods are modified in a defined manner or subjected to a random fluctuation within given limits by the control means.

A holographic display device for implementing the method includes one after another the following means, seen in the direction of light propagation:

An illumination means that emits coherent light pulses with slightly different wavelengths one after another at a fast pace for illuminating an optical reconstruction system and a light modulator, An optical reconstruction system for transforming a fast-paced sequence of modulated complex-valued wave fronts into an eye position in a reconstruction space and for creating multiple reconstructions of the same 3D scene one after another at a fast pace at the same position in a reconstruction space, An encoding means in the form of a light modulator, on to which a hologram of a 3D scene is encoded, and A control means for controlling the illumination means, the encoding means and the optical reconstruction system.

According to another embodiment, the holographic display device according to this invention for implementing the method includes one after another the following means, seen in the direction of light propagation:

Multiple illumination means which simultaneously emit coherent light with slightly different wavelengths for simultaneously illuminating an optical reconstruction system and a light modulator, An optical reconstruction system for simultaneously transforming multiple modulated complex-valued wave fronts of a hologram into an eye position in a reconstruction space and for simultaneously creating and overlapping multiple reconstructions of the same 3D scene at the same position in a reconstruction space, An encoding means in the form of a light modulator, on to which the hologram of the 3D scene is encoded, An imaging means which comprises multiple optical imaging systems which are arranged adjacently in at least one dimension, for imaging the coherent light of the illumination means into multiple optical fibres, and A control means for controlling the illumination means, the encoding means and the optical reconstruction system.

An essential feature of the present invention is that the minor modification of the wavelengths ranges within several nanometres. Such a modification of the wavelengths is sufficient to create multiple, slightly modified reconstructions of the same 3D scene with modified speckle patterns in the reconstruction space. The respective eye of the observer averages from the eye position or from the observer window the speckle patterns and sees only one single reduced-speckle reconstruction of the original 3D scene.

A holographic display device for reducing speckle patterns is for example a holographic display.

A holographic display device with an observer window differs substantially from a conventional Fourier hologram or from a Fresnel hologram as regards the wavelength dependence of the holographic reconstruction.

In a plane reconstruction of a Fourier hologram, the reconstruction would be sized differently as the wavelength of the light changes. The larger the wavelength the larger would be the entire reconstruction. Individual object points would then be displaced laterally relative to a reconstruction at a smaller wavelength. When mixing multiple wavelengths, speckle would be reduced if the displacement of the object points with respect to each other was greater than the size of the speckles.

In the holographic display device with an observer window, it is this observer window that lies in the Fourier plane of the hologram. A change in the wavelength results in a change in the size of the observer window.

Initially, this has the following effects: if the eye pupil were situated at the edge of the observer window of the greatest wavelength, the observer would only see a reconstruction of that wavelength. If the eye pupil were situated within the observer window of the smallest wavelength, he would see the reconstruction of all wavelengths.

However, in contrast to an ordinary Fourier hologram or Fresnel hologram, the lateral position of a reconstructed object point of the three-dimensional scene does not change depending on the wavelength.

The individual object points are encoded as lenses in the hologram. The wavelength is taken into account in this code. An encoded lens which has a certain focal length at a certain wavelength, changes its focal length inversely proportional to the wavelength. A change in the wavelength thus results in a change in the depth of the reconstructed object point.

Speckle reduction using different wavelengths is thus realised in a holographic display device with an observer window by way of changing the depth of the reconstruction as the wavelength changes.

In particular, if the eye pupil moves within the observer window, the wavelength-dependent change in depth will result in a parallax effect outside the centre of the observer window. The observer will then see from his eye position the reconstruction of the different wavelengths side by side.

Speckle is particularly reduced if this parallax is at least as large as the speckle size. Speckle reduction using different wavelengths is thus improved from the centre towards the edge of the observer window.

The described speckle reduction effect is smaller than that in a conventional Fourier hologram. The change in the wavelengths must thus be in the range of several nanometres. Typical sizes can be 10 or 20 nanometres.

A wavelength range which is large enough to cause a perceivably blurred reconstruction, i.e. to impair quality, in an ordinary Fourier hologram, can cause a good reconstruction quality with reduced speckle patterns in a holographic display device with an observer window.

By way of adequately designing the individual display components, in particular the optical components, the display can be realised either as a projection display or as a direct-view display.

Both, lasers and LEDs can be used as illumination means in the various embodiments of the present invention. An inherently wide-banded light source like a LED can already help to reduce speckle patterns because of its spectrum. However, the laser has the advantages that it can be approximated as a point light source and that it provides a higher performance.

A further advantage of the present invention is that the hologram must only be encoded once, in contrast to the prior art, and that it does not have to be recomputed several times which results in a reduction of computing time.

BRIEF DESCRIPTION OF THE DRAWINGS

The claimed invention will be described in detail below with the help of embodiments, in conjunction with the accompanying drawings, wherein

Like numerals denote like components in the individual Figures and accompanying description.

DETAILED DESCRIPTION

The observer window this invention is based on for reconstructing the 3D scene is identical to the visibility region with an eye position which represents the position in the reconstruction space to which multiple intensity distributions of the complex-valued wave fronts of the encoded hologram are transformed one after another at a fast pace or simultaneously, said intensity distributions having slightly different wavelengths. One eye of an observer must be situated in this eye position to enable him to see the reconstructed 3D scene.

Figure 1:
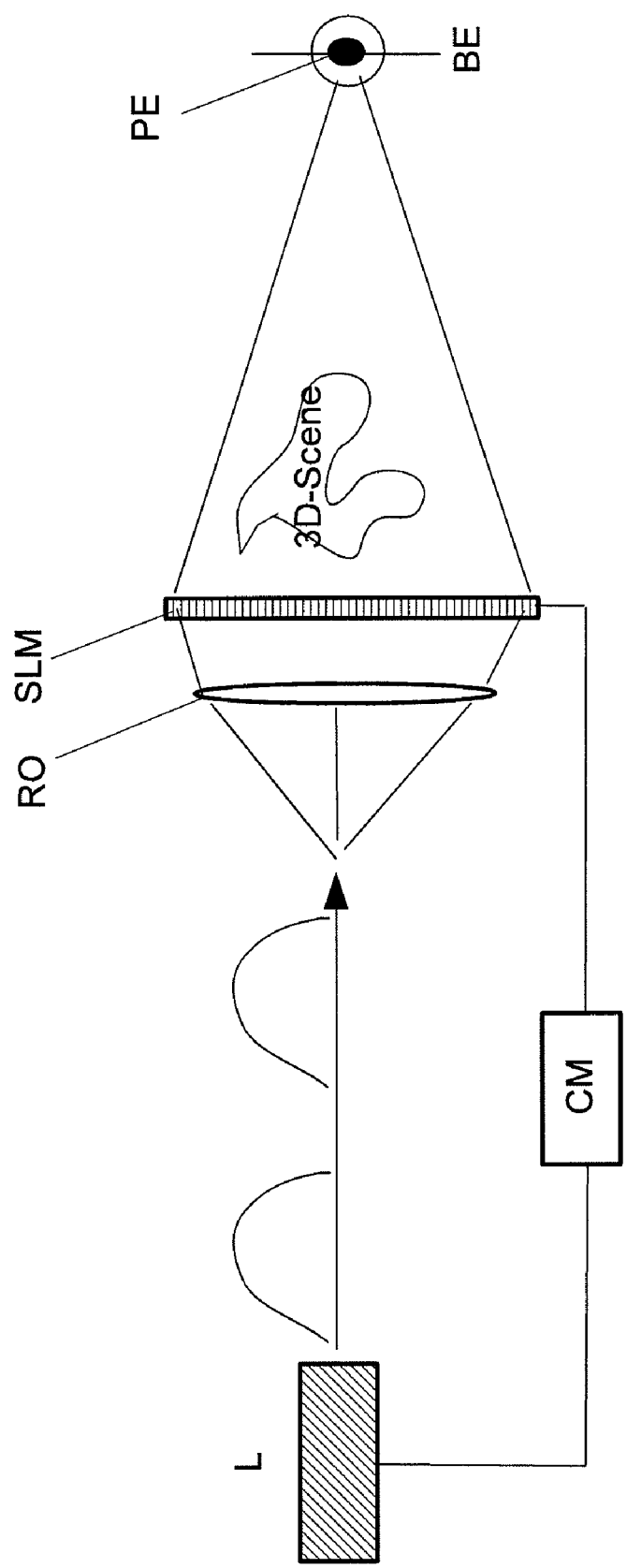
FIG. 1 shows a schematic top view of a holographic direct-view display according to a first embodiment.

FIG. 1 is a schematic and simplified top view showing a first possible embodiment of a holographic direct-view display. An illumination means L in the form of a laser, an optical reconstruction system RO in the form of a transformation lens, and a pixilated light modulator SLM are disposed one after another, seen in the direction of light propagation. A reconstruction of a 3D scene is represented in a frustum-shaped reconstruction space that stretches between the light modulator SLM and an eye position PE. The reconstruction of the 3D scene is entirely visible to an observer eye at this eye position PE, which lies in the rear focal plane of the transformation lens. The illumination and thus also the components in the optical path which are touched by the light are controlled by a control means CM.

The light modulator SLM and the transformation lens, which is arranged in front of it, are illuminated with sufficiently coherent light by a laser which is externally controlled by the control means CM. The direction of light propagation is indicated by an arrow. By quickly switching on and off the laser, the control means CM causes it to generate a fast-paced sequence of coherent light pulses, where each pulse represents a complex-valued wave front and where the light pulses have different wavelengths. The light pulses are schematically represented by multiple intensity curves on the arrow line in FIG. 1.

The wavelengths of the individual, only slightly different light pulses can be modified in a defined manner by respectively programmed instructions in the control means CM or exposed to a random fluctuation within a given limit. The modification of wavelengths is preferably realised within a few nanometres, so that the subsequent reconstructions and the respective speckle patterns do not have major differences when they are averaged.

The fast-paced sequence of light pulses are modulated with the encoded hologram values of a 3D scene in the light modulator SLM and are transformed one after another at a fast pace into the rear focal plane BE of the transformation lens arranged in front of the light modulator SLM, where the transformation lens also represents the optical reconstruction system RO. The rear focal plane BE of the optical reconstruction system RO lies in a reconstruction space where the eye position PE is also always situated. The modulated complex-valued wave fronts create multiple reconstructions of the same 3D scene one after another at a fast pace with slightly different speckle patterns at the same position in the reconstruction space. The reconstructions are perceived by an observer eye from the eye position PE as a single reconstruction of the 3D scene with an averaged speckle pattern.

Although fast-paced sequences of light pulses are generated, the same hologram can always preferably be displayed on the light modulator with conventional refresh frequency. The hologram computation then only has to be realised at this refresh frequency.

The embodiment according to FIG. 1 has another major advantage: the number of reconstructions of the 3D scene can be increased freely without the need of any additional components in order to reduce the occurring speckle patterns.

Figure 2:
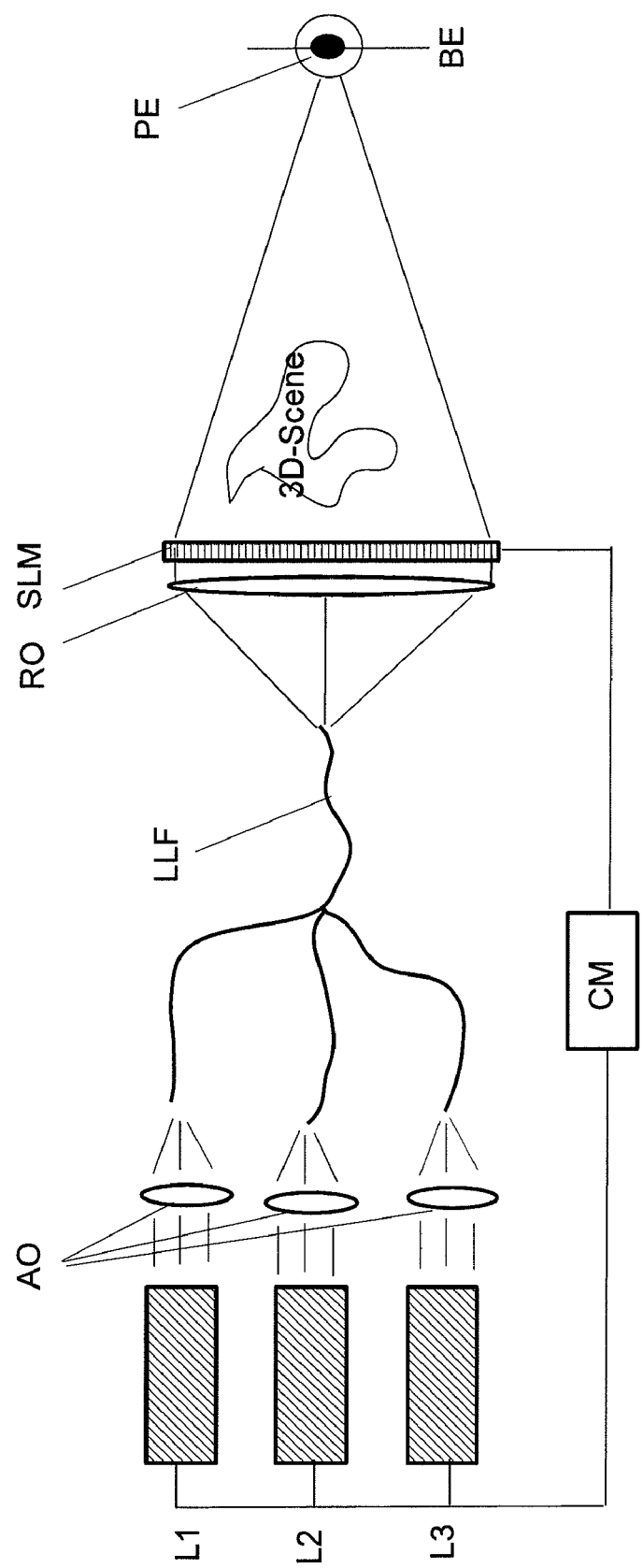
FIG. 2 shows a schematic top view of a holographic direct-view display according to a second embodiment.

FIG. 2 is a schematic and simplified top view showing a second possible embodiment of a holographic direct-view display. Illumination means L1, L2 and L3 in the form of three lasers arranged side by side, an imaging means AM in the form of three adjacently arranged one-dimensional optical imaging systems AO, an optical reconstruction system RO in the form of a transformation lens, and a pixelated light modulator SLM are disposed one after another, seen in the direction of light propagation. This embodiment allows three slightly different reconstructions with slightly different speckle patterns to be created in order to be averaged by an eye. It goes without saying that the number of lasers and the respective optical imaging systems can be freely increased in order to simultaneously create a larger number of reconstructions and to improve the speckle reduction by averaging.

The reconstruction of the 3D scene is represented in a frustum-shaped reconstruction space that stretches between the light modulator SLM and the eye position PE. The reconstruction of the 3D scene is entirely visible to an observer eye at the eye position PE, which lies in the rear focal plane of the transformation lens. The illumination and thus also the components in the optical path which are touched by the light are controlled by a control means CM.

Initiated by the programme in the control means CM, three lasers with slightly different wavelengths emit sufficiently coherent light, which is imaged by a corresponding optical imaging system into an optical fibre, for example. Both the lasers and the optical imaging systems AO are adjacently arranged in one dimension. The lasers can alternatively be arranged in two dimensions, as a composite component, if there are many of them. A suitable imaging means for two-dimensional imaging of the two-dimensional composite component is preferably formed as matrix lens array.

The light of the optical fibres is united in a single optical fibre LLF and illuminates, controlled by the programme in the control means CM, the transformation lens and the light modulator SLM with combined light with three slightly different wavelengths. The transformation lens transforms the light with different wavelengths into its rear focal plane BE, to the eye position PE. If an observer eye is situated at this position, three complex-valued wave fronts with different wavelengths will be provided simultaneously so as to create three reconstructions of the 3D scene at the same time with the help of the transformation lens. Because the three reconstructions with slightly different speckle patterns are simultaneously created and overlapped at the same position in the reconstruction space, the eye averages these reconstructions and perceives only one single reconstruction of the 3D scene with reduced speckle pattern.

A light modulator with conventional refresh frequency can also be used for the method according to FIG. 2, and the hologram computation may preferably be realised only at this frequency.

The Fourier transformation is preferably used in the method according to the present invention, because it can be implemented in programmes easily and can be realized very precisely in optical systems.

The hologram can be variably encoded in the embodiments in FIG. 1 and FIG. 2, so that the reconstructions of the 3D scene are visible in front of and/or behind the screen. The light modulator SLM here simultaneously fulfils the function of the screen.

In FIG. 1 and FIG. 2, the position information of an observer eye is typically detected by a position detection system (not shown) and is processed by the control means CM. The details shall be omitted here.

A method for reducing speckle in a reconstruction of a 3D scene in a holographic direct-view display, as described in the embodiments, may also be applied to a holographic projection display, according to the claimed invention.

The invention claimed is:

1. Method for reducing speckle in a three-dimensional holographic reconstruction created in a holographic display device, comprising:
    encoding a hologram of a 3D scene on a controllable light modulator and illuminating said hologram with sufficiently coherent light,
    using an optical reconstruction system, transforming the light which is spatially modulated in the light modulator into the rear focal plane, where an observer window is formed in the rear focal plane, and reconstructing the 3D scene in a reconstruction space, and
    controlling the illumination of said hologram with a control means,
    wherein:
    the control means controls the illumination of the light modulator such that multiple modulated complex-valued wave fronts of the same 3D scene with slightly different wavelengths exit the light modulator;
    the optical reconstruction system transforms said wave fronts into the rear focal plane where they are superimposed, and generates from each complex-valued wave front a reconstruction of the same 3D scene in the reconstruction space;
    the slightly different wavelengths are in a wavelength range within several nanometres of each other; and
    the individual reconstructions are slightly modified reconstructions of the same 3D scene with modified speckle patterns in the reconstruction space, said reconstructions being averaged from the eye position as a single reduced-speckle reconstruction of the 3D scene.

2. Method for reducing speckle according to claim 1,
    where an illumination means is controlled by a control means to generate a fast-paced sequence of coherent light pulses with slightly different wavelengths in order to illuminate the optical reconstruction system and the light modulator,
    where the fast-paced sequence of light pulses are modulated with the encoded hologram values in the light modulator, and
    where the optical reconstruction system transforms the fast-paced sequence of the modulated complex-valued wave fronts of the light pulses into the rear focal plane where they are superimposed, and creates multiple reconstructions of the same 3D scene with different depth one after another at a fast pace in the reconstruction space.

3. Method for reducing speckle according to claim 2, where the different wavelengths are varied in a defined manner by the control means or where they are exposed to a random fluctuation within given limits.

4. Holographic display device for implementing the method according to claim 2, wherein the following means are provided in the direction of light propagation:
    an encoding means in the form of a light modulator, on which a hologram of a 3D scene is encoded,
    an illumination means that emits a fast-paced sequence of coherent light pulses in wave fronts with slightly different wavelengths for illuminating an optical reconstruction system and the light modulator,
    an optical reconstruction system for transforming a fast-paced sequence of modulated complex-valued wave fronts into the rear focal plane where they are superimposed, and for creating multiple reconstructions of the same 3D scene with different depth one after another at a fast pace in the reconstruction space, and
    a control means for controlling the illumination means, the encoding means and the optical reconstruction system.

5. Holographic display device according to claim 4, where the illumination means for the light modulator is optionally a laser or a LED.

6. Holographic display which comprises a holographic display device according to claim 5, where the optical components are modified such to realise either a direct-view display or a projection display.

7. Holographic display device according to claim 4, where the modification of the wavelengths ranges within several nanometres.

8. Holographic display which comprises a holographic display device according to claim 7, where the optical components are modified such to realise either a direct-view display or a projection display.

9. Holographic display device according to claim 4, where the eye position of an observer eye lies in the rear focal plane of the optical reconstruction system.

10. Holographic display which comprises a holographic display device according to claim 9, where the optical components are modified such to realise either a direct-view display or a projection display.

11. Holographic display which comprises a holographic display device according to claim 4, where the optical components are modified such to realise either a direct-view display or a projection display.

12. Method for reducing speckle according to claim 1,
    where multiple illumination means are controlled by the control means to simultaneously emit multiple coherent wave fronts with slightly different wavelengths to simultaneously illuminate the optical reconstruction system and the light modulator,
    where the wave fronts with slightly different wavelengths are simultaneously modulated with the encoded hologram values in the light modulator, and
    where the optical reconstruction system simultaneously transforms multiple modulated complex-valued wave fronts into the rear focal plane where they are superimposed, and simultaneously creates multiple reconstructions of the same 3D scene with different depth in the reconstruction space.

13. Method for reducing speckle according to claim 12, where the coherent light of the individual illumination means is directed into separate optical fibres with the help of a separate optical imaging system of an imaging means, and where it is subsequently united in a single optical fibre for illuminating the optical reconstruction system and the light modulator.

14. Holographic display device for implementing the method according to claim 12, wherein the following means are provided in the direction of light propagation:
    an encoding means in the form of a light modulator, on which a hologram of a 3D scene is encoded,
    multiple illumination means which simultaneously emit coherent light with slightly different wavelengths for simultaneously illuminating an optical reconstruction system and the light modulator,
    an imaging means which comprises multiple optical imaging systems which are arranged contiguously in at least one dimension, for imaging the coherent light of the illumination means into multiple optical fibres, which are followed by the optical reconstruction system which simultaneously transforms multiple modulated complex-valued wave fronts into the rear focal plane where they are superimposed, and simultaneously creates multiple reconstructions of the same 3D scene with different depth in the reconstruction space, and a control means for controlling the illumination means, the encoding means and the optical reconstruction system.

15. Holographic display device according to claim 14, where the illumination means are disposed in a spatial composite arrangement and simultaneously emit coherent light with slightly different wavelengths.

16. Holographic display which comprises a holographic display device according to claim 15, where the optical components are modified such to realise either a direct-view display or a projection display.

17. Holographic display device according to claim 14, where the modification of the wavelengths ranges within several nanometres.

18. Holographic display device according to claim 14, where the eye position of an observer eye lies in the rear focal plane of the optical reconstruction system.

19. Holographic display which comprises a holographic display device according to claim 14, where the optical components are modified such to realise either a direct-view display or a projection display.

20. Method for reducing speckle according to claim 12, where the different wavelengths are varied in a defined manner by the control means or where they are exposed to a random fluctuation within given limits.

* * * * *